United States Patent [19]

Austin

[11] Patent Number: 5,373,605
[45] Date of Patent: Dec. 20, 1994

[54] LATERAL TRAVEL WINDSHIELD WIPER WITH SPEED MULTIPLICATION

[76] Inventor: Lee Austin, 6921 Canterbury, Huntington Beach, Calif. 92647

[21] Appl. No.: 104,879

[22] Filed: Aug. 10, 1993

[51] Int. Cl.⁵ .............................. B60S 1/20; B60S 1/44
[52] U.S. Cl. ............................... 15/250.24; 15/250.29; 15/250.30; 74/37; 254/393; 254/394
[58] Field of Search ............ 15/250.24, 250.25, 250.29, 15/250.30, 103; 74/37; 254/389, 390, 393, 394, 399

[56] References Cited

U.S. PATENT DOCUMENTS

| | | | |
|---|---|---|---|
| 1,720,832 | 7/1929 | Gibson | 15/250.24 |
| 1,748,055 | 2/1930 | Brown et al. | 15/250.24 |
| 2,086,054 | 7/1937 | Swenson | 15/250.24 |
| 2,648,087 | 8/1953 | Kiker, Jr. | 15/250.24 |
| 2,759,213 | 8/1956 | Trotta | 15/250.29 |
| 2,995,766 | 8/1961 | Kuhn | 15/250.25 |
| 3,354,494 | 11/1967 | Rischman | 15/250.24 |

FOREIGN PATENT DOCUMENTS 1093236 11/1960 Germany ...................... 15/250.24

Primary Examiner—David A. Scherbel
Assistant Examiner—Gary K. Graham
Attorney, Agent, or Firm—Roy A. Ekstrand

[57] ABSTRACT

An elongated track receives and supports a movable wiper arm carriage having a windshield wiper extending therefrom. A plurality of pulleys couple the wiper arm carriage to an oscillatory drive mechanism having a reciprocating carriage. The pulley and cable system provides a distance multiplication in which the wiper arm carriage moves a substantially greater distance in response to motion of the oscillatory system carriage. A single direction drive motor is coupled to the oscillatory drive which includes a rotating arm together with a pivotally supported connecting arm and slider coupled to a guide bar supported upon and coupled to the oscillatory system carriage.

8 Claims, 2 Drawing Sheets

LATERAL TRAVEL WINDSHIELD WIPER WITH SPEED MULTIPLICATION

CROSS-REFERENCE TO RELATED APPLICATION

This application is related to a prior application entitled Lateral Travel Windshield Wiper, filed Sep. 30, 1991, in the name of the applicant of this application and having Ser. No. 07/767,900 which is now abandoned.

FIELD OF THE INVENTION

This invention relates generally to windshield wipers for vehicles and the like particularly to those moving a wiper blade in a linear or lateral travel path.

BACKGROUND OF THE INVENTION

From the earliest conceptions of movable vehicles such as automobiles and the like, the need has arisen for an effective means for clearing or wiping the windshield when the vehicle is operated in rain, snow or, other precipitation. The general development of such windshield wipers developed from early hand operated units to the later developed electrically powered windshield wipers. While various configurations of windshield wipers have been attempted in the past, generally all present day vehicles utilize wiper systems in which one or more wiper blades are moved back and forth across the windshield in an arc-shaped path by a pivotally supported motor driven wiper arm. Because the great majority of vehicle windshields are generally rectangular in shape, the arc-shaped path of the windshield wiper blades service a limited portion of the windshield area leaving other portions unwiped. In attempts to minimize the unwiped portions of the windshield surfaces practitioners in the art have utilized pluralities of wiper blades having overlapped arc-shaped travel paths. While this has provided some improvement and reduced the unwiped area of the vehicle windshield, there remain significant windshield areas which are unattended and thus pose a potential visual impediment and hazard to the vehicle operator. In addition to the problems arising from the use of rectangular shaped windshields, designers of vehicles are further motivated by aesthetic and structural considerations to provide windshields which are curved. The curved aspect of windshields further exacerbates the problems of covering the windshield area with wiper systems having arced travel paths.

A number of designers have recognized the effectiveness of providing windshield wipers which move one or more wiper blades in a linear or lateral travel path across the windshield. This system is inherently advantageous in terms of minimizing unserviced areas of the VEHICLE windshield. However, practical attempts to produce lateral travel windshield wipers have been frustrated by the complexities and difficulties of the drive systems used to move the wiper blade back and forth across the windshield surface. As a result, most vehicle manufacturers have been unsuccessful in producing a practical lateral travel wiper drive mechanism and have settled for the simpler mechanisms used to drive the arced path type wipers.

U.S. Pat. No. 934,007 issued to Null sets forth a WINDOW CLEANER in which a blade support is positioned beneath a windshield and receives a slide member thereon. The slide member supports a vertical wiper arm which in turn supports a wiper blade. A flexible belt mechanism is supported beneath the blade support and is driven by a crank assembly. The crank motion of the crank assembly is converted to linear motion of the wiper arm to move the blade back and forth across the windshield.

U.S. Pat. No. 1,665,570 issued to Waters sets forth a ELECTRIC WINDSHIELD WIPER in which a motor driven slide is moved back and forth across the upper portion of a vehicle windshield. A belt drive is operative upon the slide and a downwardly extending wiper arm is supported by the slide and in turn supports a wiper blade.

U.S. Pat. No. 1,720,832 issued to Gibson sets forth a WINDSHIELD WIPER in which an endless band defines a plurality of perforations and is driven by an electric motor drive. A slide member is coupled to the endless band which supports a downwardly extending wiper arm and wiper assembly. The electric motor drives the endless band to move the slide and wiper assembly across the windshield.

U.S. Pat. No. 1,748,055 issued to Brown, et al. sets forth an WINDSHIELD WIPER in which a slide track is positioned within an endless belt or chain drive assembly, A slide member is movable upon the slide track and supports a windshield wiper. A pivotal coupling arm is secured to the endless belt or chain and converts the single direction motion of the endless belt or chain to a reciprocating slide motion for the wiper arm supported by the slide.

U.S. Pat. No. 1,846,588 issued to Dudley sets forth a WINDSCREEN WIPER in which a pair of wiper arms are supported in a sliding track and driven laterally by an endless belt. The arms are spaced apart upon the belt and are moved in unison back and forth across the windshield.

U.S. Pat. No. 2,063,055 issued to Shaw sets forth a WINDSHIELD WIPER which utilizes a dual system of endless belts and slide members coupled thereto to provide a pair of laterally moving windshield wipers upon a common windshield.

U.S. Pat. No. 2,648,087 issued to Kiker, Jr. sets forth a WINDSHIELD WIPER in which an endless belt or cable is movably supported in a track system which encircles a generally rectangular windshield. A pair of slide members support a vertical wiper arm and means are provided for coupling the slide members to the moving belt to provide lateral travel thereof.

U.S. Pat. No. 3,505,702 issued to Omlie, et al. sets forth a WINDOW WIPING APPARATUS HAVING A LINEARLY MOVABLE WIPER in which a lateral travel wiper assembly is supported on the rear windshield of a vehicle. The Wiper assembly includes an endless belt drive system and movable slide supporting a vertical wiper arm. The wiper arm is movable to an alternate horizontal position for storage.

U.S. Pat. No. 3,032,797 issued to Presser sets forth a WINDOW CLEANING DEVICE for simultaneously and automatically cleaning the opposite surfaces of a window pane. The apparatus includes a wetting or moisturizing means coactive with the window wiping elements. A pair of wiping elements or blades are positioned on opposite sides of the window and moved back and forth as the window is cleaned.

U.S. Pat. No. 2,944,276 also issued to Presser sets forth a WINDOW CLEANING DEVICE in which a motor driven continuous belt moves a wiper blade upon a planar window surface. In its preferred form, a pair of track supports and endless belts move a pair of oppositely positioned carriages having a wiper blade secured therebetween.

Additional patents have been found generally related to apparatus such as that utilized in various reciprocating machine systems such as U.S. Pat. Nos. 2,433,180; 3,693,773; 3,530,268; and 4,441,692. In further addition, several foreign patents have been found which are directed to similar objectives to the present invention which include British Patent 2,085,713, French Patent 1,067,491; British Patent 540,427; German Patent 1,093,236; and Japanese Patent 59-29548.

While the foregoing described prior art devices are representative of the attempts to produce a practical lateral travel windshield wiper, their mechanisms have proven to be generally cumbersome, expensive and often unreliable. There remains, therefore, a need in the art for an effective, efficient and reliable lateral travel windshield wiper system.

SUMMARY OF THE INVENTION

Accordingly, it is a general object of the present invention to provide an improved windshield wiper. It is a more particular object of the present invention to provide an improved windshield wiper which effectively moves a wiper blade in a lateral or linear travel path. It is a still more particular object of the present invention to provide an improved windshield wiper movable in a lateral travel path which utilizes an effective, reliable and relatively inexpensive drive mechanism.

In accordance with the present invention, there is provided for use in a vehicle having a vehicle window, a lateral travel wiper comprises: a wiper arm carriage slidably supported in proximity to the vehicle window; a wiper supported upon the wiper arm carriage; a movable drive carriage; an oscillatory drive coupled to the drive carriage for moving the drive carriage in a reciprocating motion; a single direction drive motor coupled to the oscillatory drive; an endless cable coupled to the drive carriage and the wiper arm carriage; and a plurality of rotatable pulleys forming a distance multiplying path for the cable such that the wiper arm carriage is moved a substantially greater distance in response to movement of the drive carriage.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
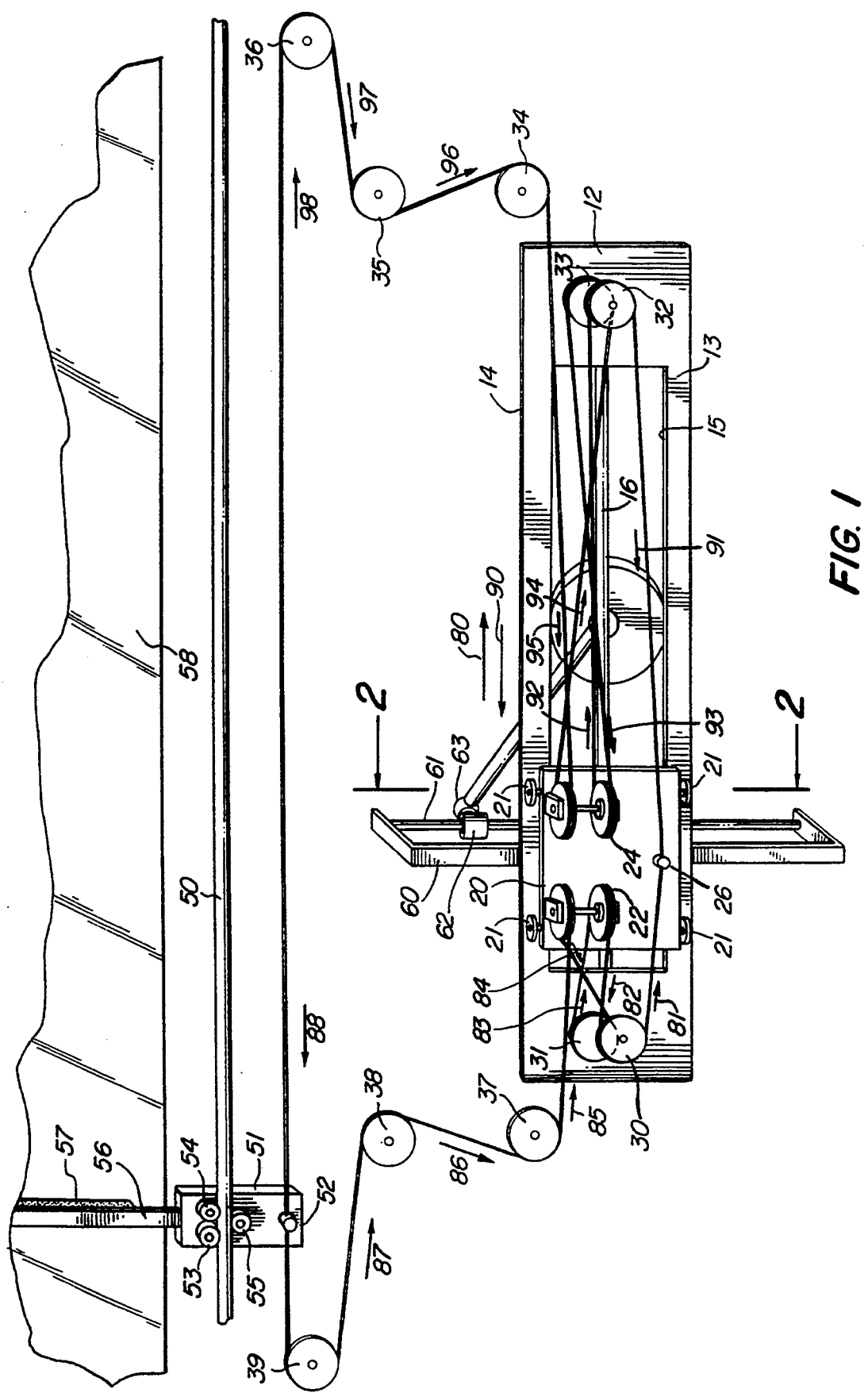
FIG. 1 sets forth a diagrammatic view of a lateral travel windshield wiper constructed in accordance with the present invention.

FIG. 1 sets forth a diagrammatic view of a lateral travel windshield wiper system constructed in accordance with the present invention and generally referenced by numeral 10. Wiper system 10 includes an elongated support plate 12 having side portions 13 and 14 and defining an elongated aperture 15 therein. Wiper system 10 includes a carriage 20 movably supported upon support 12 by a plurality of rollers 21. Carriage 20 supports a plurality of rotatable pulleys 22, 23, 24 and 25 arranged in opposed pairs upon carriage 20 and secured thereto using conventional attachment means (not shown). An elongated guide bar 16 is secured to the undersurface of support plate 12 and is maintained in a fixed position spanning aperture 15. Carriage 20 is slidably coupled to guide 16 by conventional attachment means (not shown) such that carriage 20 is movable upon support plate 12 in a fixed path defined by guide 16. An elongated frame 60 supports a guide bar 61 and is secured to the undersurface of carriage 20 by conventional fastening means (not shown). Frame 60 and guide bar 61 are thus movable as carriage 20 moves upon support plate 12. An electric motor 70 includes an output coupling 71 (seen in FIG. 2) coupled to an arm 64.

A movable slider 62 is received upon guide bar 61 and is movable in a sliding fashion upon the guide bar. Slider 62 includes a coupling 63 which receives the outer end of a connecting arm 64 in a pivotal attachment.

Support plate 12 further supports a pair of pulleys 30 and 31 using conventional attachment means at one end of support plate 12 and a second pair of pulleys 32 and 33 similarly supported at the opposite end of support plate 12. Pulleys 30 through 33 remain fixed in their position upon support plate 12 while pulleys 22 through 25 remain fixed in their position upon movable carriage 20.

An elongated wiper arm track 50 receives a wiper arm carriage 51 which is secured to track 50 by a plurality of rollers 53, 54 and 55 to provide a sliding or movable attachment of carriage 51 upon track 50. Thus, carriage 51 is movable back and forth upon track 50 in the directions indicated by arrows 88 and 98. Carriage 51 further supports an upwardly extending wiper arm 56 which in turn supports a conventional wiper 57 upon a vehicle windshield 58.

In accordance with an important aspect of the present invention, an endless flexible cable 100 is secured to carriage 20 by a cable attachment 26 at one point and is secured to wiper arm carriage 51 by a cable attachment 52 at a different point. Cable 100 extends in one direction from attachment 26 and is wrapped about pulleys 30, 22, 31, 23, 37, 38 and 39 and is thereafter secured to attachment 52 of carriage 51. Cable 100 extends oppositely from attachment 26 and is wound about pulleys 32, 24, 33, 25, 34, 35 and 36 to cable attachment 52 of carriage 51. Pulleys 34, 35 and 36 provide stationary pulleys rotatably supported upon the host vehicle by conventional attachment means at stationary positions. Similarly, pulleys 37, 38 and 39 are pivotally supported at stationary positions upon the host vehicle by conventional attachment means (not shown).

In operation and by way of overview, wiper system 10 functions in response to single direction rotation of motor 70 which in turn rotates arm 64 in a selected direction which in turn produces an oscillatory linear motion of carriage 20 due to the coupling between connecting arm 64, guide bar 61 and frame 60. As carriage 20 is moved back and forth upon support plate 12, the fixed attachment of cable 100 to carriage 20 causes a corresponding oscillatory motion of cable 100. The oscillatory motion of cable 100 is coupled to wiper arm carriage 51 by cable attachment 52 causing wiper arm carriage 51 to move back and forth upon track 50 producing a corresponding back and forth motion of wiper arm 56 and wiper 57 upon windshield 58 of the host vehicle. Thus, in accordance with an important aspect of the present invention described below in greater detail, wiper system 10 utilizes the single direction motor and oscillatory coupling system to produce oscillatory motion of the vehicle wiper. In accordance with a further advantage of the present invention system, the multiple pulley coupling system operative between carriage 20 and wiper arm carriage 51 produces a distance multiplication of the oscillatory motion between carriage 20 and carriage 51 to provide a long wiper travel path upon the windshield of the host vehicle.

More specifically, motor 70 is operative through connecting arm 64 and slider 62 to transfer the rotational motion arm 64 to linear motion of bar 61 in a coupling similar to a crank arm coupling. This motion inturn causes carriage 20 to be moved back and forth upon support plate 12 in the directions indicated by arrows 80 and 90. As carriage 20 moves in the direction indicated by arrow 80, the portion of cable 100 between attachment 26 and pulley 30 is drawn in the direction indicated by arrow 81. As a result, pulley 30 rotates drawing the cable portion between pulleys 30 and 22 in the direction indicated by arrow 82 which in turn rotates pulley 22 drawing the cable segment between pulleys 22 and 31 in the direction indicated by arrow 83. Pulley 31 is rotated drawing the cable portion between pulleys 31 and 23 in the direction indicated by arrow 84 causing pulley 23 to rotate. The rotation of pulley 23 draws the cable portion between pulleys 23 and 37 in the direction indicated by arrow 85. Correspondingly, the cable segments between pulleys 37 and 38 and between pulleys 38 and 39 are drawn in the directions indicated by arrows 86 and 87 respectively. Finally, the motion of the cable segment between pulleys 38 and 39 in the direction of arrow 87 draws the cable segment between pulley 39 and attachment 52 in the direction indicated by arrow 88. As a result, wiper arm carriage 51 is moved upon track 50 in the direction indicated by arrow 88.

Conversely, as arm 64 continues to rotate, and carriage 20 is returned in the opposite direction indicated by arrow 90, the attachment of cable 100 at attachment 26 to carriage 20 draws the portion of cable 100 between attachment 26 and pulley 32 in the direction indicated by arrow 91. This in turn draws the cable segment between pulleys 32 and 24 in the direction indicated by arrow 22 and results in drawing the cable segment between pulleys 24 and 33 in the direction indicated by arrow 93. The cable segment between pulleys 33 and 25 is drawn in the direction indicated by arrow 94 while the cable segment between pulleys 25 and 34 is drawn in the direction indicated by arrow 95. The segments of cable 100 between pulleys 34 and 35 and between pulleys 35 and 36 is drawn in the directions indicated by arrows 96 and 97 respectively. Finally, the drawing motion upon cable 100 in the direction indicated by arrow 97 causes the cable segment between pulley 36 and cable attachment 52 to be drawn in the direction indicated by arrow 98. The motion of the cable segment between pulley 36 and attachment 52 produces a corresponding motion upon track 50 of carriage 51 in the direction indicated by arrow 98.

Thus, as motor 70 rotates arm 64 through successive rotations, each rotation of arm 64 produces a complete cycle of motion in the directions indicated by arrows 80 and 90 for carriage 20 which in turn produces corresponding motion of wiper arm carriage 51 in the directions indicated by arrows 88 and 98. As motor 70 continuously runs in a single direction, the oscillatory bidirectional motion of carriage 20 is applied to wiper arm carriage 51 to provide successive oscillatory cycles of wiper arm motion. The multiple pulley coupling mechanism of the present invention system produces a distance multiplication between the travel distance of carriage 20 and the travel distance of wiper arm carriage 51 which produces the desired stroke length for wiper arm activity for the host vehicle windshield.

It will be apparent to those skilled in the art that alternative pulley combinations may be utilized in coupling carriage 20 to wiper arm carriage 51 to achieve alternative distance multiplications without departing from the spirit and scope of the present invention. In addition, it will be apparent to those skilled in the art that alternative coupling apparatus may be utilized to couple motor 70 to arm 64 in order to rotate arm 64 without departing from the spirit and scope of the present invention. In accordance with an important aspect of the present invention, it should be noted that the present invention system provides oscillatory bidirectional motion of the wiper arm and wiper arm carriage while using a single direction motor drive and while avoiding the use of troublesome and complex switching or reversing apparatus as well as any use of reversible motor costs and complexity. It should be further noted that because the present invention system operates in a single direction, a substantial degree of complexity in the coupling apparatus between the electric drive motor and the wiper arm carriage is similarly avoided.

Figure 2:
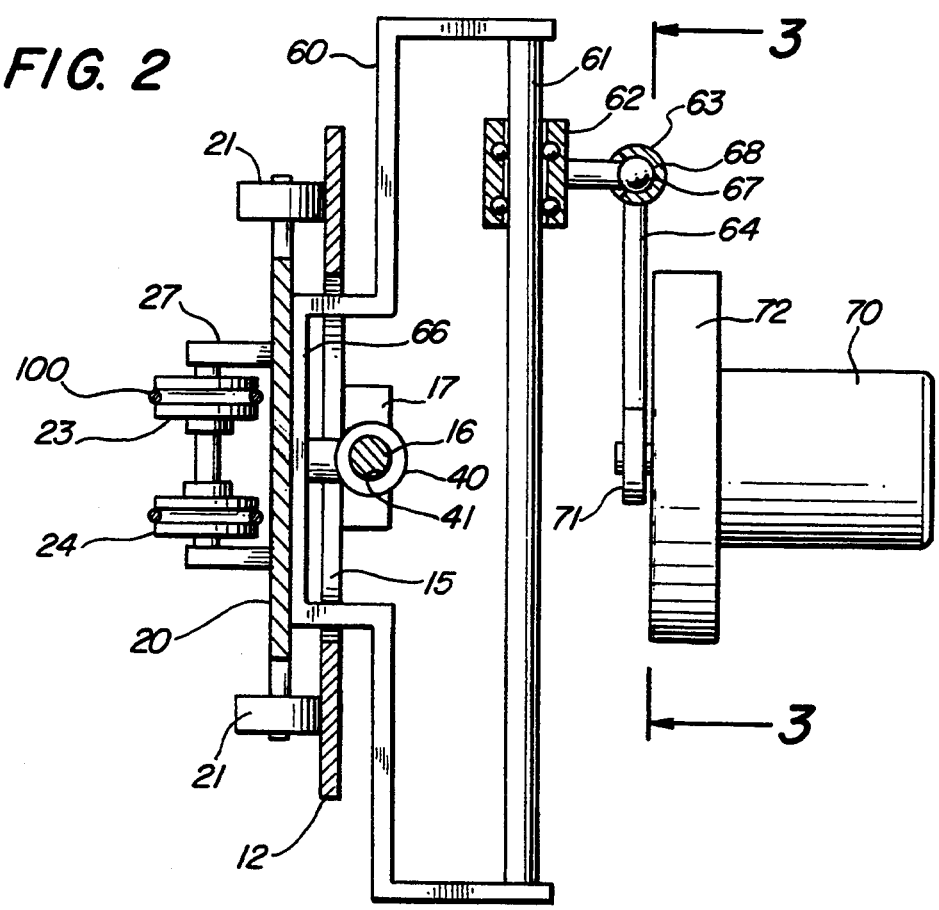
FIG. 2 sets forth a section view of the cable slider portion of the present invention lateral travel windshield wiper taken along section lines. 2—2 in FIG. 1.

FIG. 2 sets forth a section view of the present invention wiper system taken along section lines 2—2 in FIG. 1. Wiper system 10 includes a support plate 12 defining an aperture 15 therein. A carriage 20 is movably supported upon plate 12 by a plurality of rolling wheels 21. Carriage 20 further includes a pulley support 27 having a pair of pulleys 24 and 25 rotatably supported thereon. As described above, pulleys 24 and 25 receive portions of cable 100. A guide support 17 extends from support plate 12 and receives one end of a cylindrical guide rod 16. The remaining end of guide rod 16 is secured to the remaining end of support plate 12 such that guide rod 16 spans aperture 15 in support 12 in the manner seen in FIG. 1. A guide coupler 40 is secured to carriage 20 by conventional fabrication techniques and defines a cylindrical bore 41 which encircles and receives cylindrical guide rod 16 Thus, coupler 40 provides a sliding attachment to guide 16 for carriage 20.

An elongated frame 60 defines an offset portion 66 extending through aperture 15 of support plate 12 and is secured to carriage 20 using conventional fabrication techniques such as fasteners, welding or the like. Frame 60 further supports an elongated cylindrical guide bar 61. A slider 62 defines a center bore 48 received upon guide bar 61. Slider 62 further supports a plurality of bearings 47 within bore 48 for providing a low friction sliding coupling between slider 62 and guide bar 61. Coupler 40 is similar in construction to slider 62. Slider 62 further includes an outwardly extending ball member 67. A coupling 63 includes a socket 68 receiving ball 67 to provide a pivotal attachment between slider 62 and connecting arm 64 (seen in FIG. 1) which in turn is rotated by motor 70.

In operation, carriage 20 is slidably secured to support plate 12 by the cooperation of coupler 40 and cylindrical guide bar 16 together with rolling wheels 21. Thus, carriage 20 is easily moved along support plate 12. Pulley support 27 is secured to carriage 20 and supports pulleys 24 and 25 in a rotational attachment which permits pulleys 24 and 25 to receive portions of cable 100 in the manner set forth above. Frame 60 is securely coupled to guide bar 61 and is attached to carriage 20 such that forces applied to guide bar 61 are transmitted to carriage 20 in the manner described above. Slider 62 provides a low friction coupling between connecting arm 64 (seen in FIG. 1) and guide bar 61.

Figure 3:
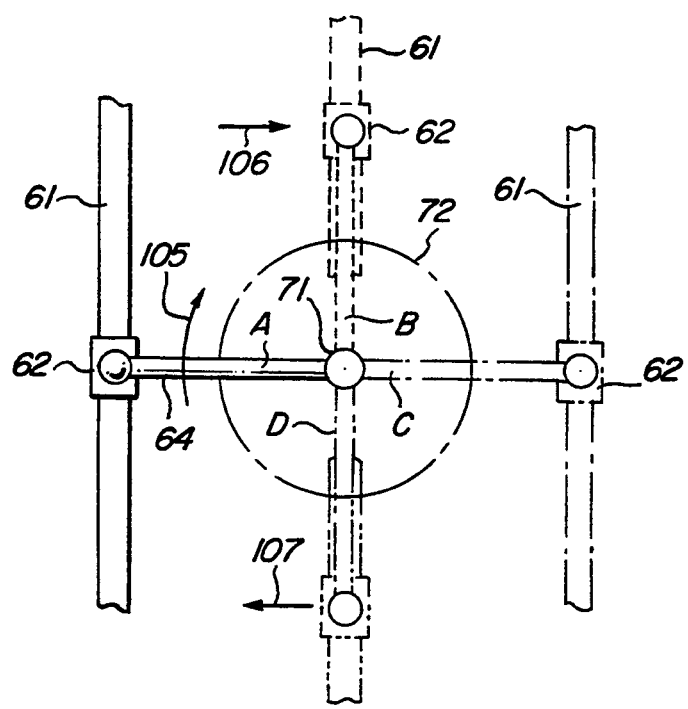
FIG. 3 sets forth a perspective view of the oscillating drive system of the present invention.

FIG. 3 sets forth a simplified diagram of the oscillating drive portion of the present invention system. By way of overview, FIG. 3 sets forth the operational sequence of the present invention oscillatory drive at four sequential positions of arm 64 as it goes through a complete rotation or cycle. Thus, beginning initially at position A and thereafter moving sequentially through positions B, C and D and thereafter returning to position A, arm 64 moves through a complete cycle with the resulting positions of guide bar 61 and slider 62 being shown in solid-line representation in FIG. A and different dashed-line representations in positions B, C and D.

More specifically with arm 64 rotated to the position indicated as position A in which slider 62 is coincident with position A, the resulting positions of guide bar 61, slider 62 and arm 64 are shown in solid-line representation. As described above, guide bar 61 is secured to carriage 20 via frame 60 (seen in FIG. 1) and, as a result, the reciprocating motions imparted to guide bar 61 are correspondingly imparted to carriage 20. Slider 62 is movable upon guide bar 61 and is coupled to arm 64 by couplings 63 and socket 68. As motor 70 (seen in FIG. 1) is energized causing arm 64 to rotate for example in the direction indicated by arrow 105, arm 64 is moved from position A to position B producing a corresponding motion of guide bar 61 in the direction indicated by arrow 106. As arm 64 continues to rotate in the direction indicated by arrow 105, slider 62 moves to the position indicated by position C. Correspondingly, guide bar 61 moves to the dashed-line position shown at position C. Thus, guide bar 61 has continued to move in the direction indicated by arrow 106 as arm 64 rotates in the direction indicated by arrow 105 from position A through position B to position C. The positions of guide bar 61 corresponding to positions A and C represent the maximum movement of guide bar 61. Thereafter, the continued rotation of arm 64 in the direction indicated by arrow 105 to position D causes guide bar 61 to be moved in the direction indicated by arrow 107 to the dashed-line position shown at position D. Finally, as disk 74 continues to rotate in the direction indicated by arrow 105 from position D to return to position A, guide bar 61 continues to move in the direction indicated by arrow 107 and ultimately returns to the solid-line representation at position A.

This process continues as the wiper system motor continues to rotate arm 64 in a single direction producing an oscillating motion of guide bar 61. Thus, all use of complex apparatus such as reversing motors, reversing switches, or other complex linkage arrangements is avoided by the present invention system.

What has been shown is a lateral travel windshield wiper for vehicles utilizing an oscillatory drive coupling in combination with a single direction drive motor and a distance multiplying pulley and cable system for moving the wiper upon the vehicle windshield. The distance multiplication provides substantial flexibility in controlling the wiper travel while the oscillatory drive greatly simplifies the provision of reciprocating motion of the wiper upon the vehicle windshield.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a vehicle having a vehicle window, a lateral travel wiper comprising:

a wiper arm carriage;

slide means for slidably supporting said wider arm carriage for movement in proximity to said vehicle window;

a wiper supported upon said wiper arm carriage;

a movable drive carriage;

support means for movably supporting said drive carriage;

an oscillatory drive coupled to said drive carriage for moving said drive carriage in a reciprocating motion upon said support means;

a single direction drive motor coupled to said oscillatory drive;

a plurality of rotatable pulleys including a first pair of pulleys supported proximate said slide means, and a second pair of pulleys supported proximate said support means, and a third pair of pulleys supported said drive carriage; and an endless cable coupled to said drive carriage and said wiper arm carriage, said cable passing over said first, second and third pairs of pulleys to form a distance multiplying pulley and cable combination in which said wiper arm carriage is moved a greater distance than said drive carriage moves in response to said oscillatory drive reciprocating said drive carriage.

2. A lateral travel wiper as set forth in claim 1 wherein said plurality of rotatable pulleys includes:

a fourth pair of pulleys supported upon said drive carriage; and a fifth pair of pulleys supported proximate said drive carriage, said cable passing about said fourth and fifth pairs of pulleys.

3. A lateral travel wiper as set forth in claim 2 wherein said endless cable is attached to said wiper arm carriage defining an attachment point and wherein said endless cable extends from said attachment point in one direction and is wound about one pulley from said first, fourth, fifth, third and second pulley pairs and is attached to said drive carriage and wherein said cable extends from said attachment point in another direction and is wound about the remaining pulley from said first, fourth, fifth, third and second pulley pairs.

4. A lateral travel wiper as set forth in claim 3 wherein said slide means is elongated, defining opposed end, said first, second, third, fourth and fifth pulley pairs are arranged in general symmetry with respect to said slide means with each pair having one pulley on one end of said slide means and the other pulley on the opposite side of said slide means.

5. A lateral travel wiper as set forth in claim 3 wherein said oscillatory drive includes:
   a rotatable member coupled to said drive motor; and
   a connecting arm coupled between said rotatable member and said drive carriage.

6. A lateral travel wiper as set forth in claim 5 wherein said oscillatory drive includes:
   an elongated guide secured to said drive carriage;
   a slider movable upon said elongated guide; and
   means for coupling said slider to said connecting arm.

7. A lateral travel wiper as set forth in claim 1 wherein said oscillatory drive includes:
   a rotatable member coupled to said drive motor; and
   a connecting arm coupled between said rotatable member and said drive carriage.

8. A lateral travel wiper as set forth in claim 7 wherein said oscillatory drive includes:
   an elongated guide secured to said drive carriage;
   a slider movable upon said elongated guide; and
   means for coupling said slider to said connecting arm.

* * * * *